(12) United States Patent
Donderici et al.

(10) Patent No.: US 9,798,031 B2
(45) Date of Patent: Oct. 24, 2017

(54) SYSTEMS AND METHODS FOR MAKING OPTIMIZED BOREHOLE ACOUSTIC MEASUREMENTS

(75) Inventors: Burkay Donderici, Houston, TX (US); Baris Guner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/111,288

(22) PCT Filed: Aug. 9, 2011

(86) PCT No.: PCT/US2011/047003
§ 371 (c)(1),
(2), (4) Date: Oct. 11, 2013

(87) PCT Pub. No.: WO2013/022429
PCT Pub. Date: Feb. 14, 2013

(65) Prior Publication Data
US 2014/0029382 A1 Jan. 30, 2014

(51) Int. Cl.
*G01V 1/48* (2006.01)
(52) U.S. Cl.
CPC ...................... *G01V 1/48* (2013.01)
(58) Field of Classification Search
CPC ........................................... G01V 1/48
USPC .................................... 367/25, 27
See application file for complete search history.

(56) References Cited

U.S. PATENT DOCUMENTS

| | | |
|---|---|---|
| 3,877,033 A | 4/1975 | Unz |
| 4,363,115 A | 12/1982 | Cuomo |
| 4,594,691 A * | 6/1986 | Kimball et al. ................. 367/32 |
| 8,542,553 B2 * | 9/2013 | Wang .............................. 367/34 |
| 2011/0058451 A1 | 3/2011 | Yoneshima |

FOREIGN PATENT DOCUMENTS

WO      2008/150253 A1    12/2008

OTHER PUBLICATIONS

International Search Report and Written Opinion, International Application No. PCT/US2011/047003, 12 pgs., dated Jun. 6, 2012.
International Preliminary Report on Patentability, International Application No. PCT/US2011/047003, dated Oct. 17, 2013, 18 pages.

* cited by examiner

*Primary Examiner* — Daniel L Murphy
(74) *Attorney, Agent, or Firm* — Benjamin Fite; Baker Botts L.L.P.

(57) ABSTRACT

A system and method for measuring a formation property in a wellbore is disclosed. In the method, an acoustic measurement tool is introduced into a wellbore. The acoustic measurement tool may include a transmitter and a plurality of sensors. At least one of the plurality of sensors may be positioned in a non-uniform spacing configuration. The transmitter may transmit energy into the formation. The plurality of sensors may measure energy received from the formation. Additionally, a time semblance of the formation may be determined using at least one time semblance algorithm generalized for non-uniform sensor spacing.

14 Claims, 12 Drawing Sheets

SYSTEMS AND METHODS FOR MAKING OPTIMIZED BOREHOLE ACOUSTIC MEASUREMENTS

CROSS-REFERENCE TO RELATED APPLICATION

This application is a U.S. National Stage Application of International Application No. PCT/US2011/047003 filed Aug. 9, 2011, and which is hereby incorporated by reference in its entirety.

BACKGROUND

The present disclosure generally relates to testing and evaluation of subterranean formations and formation fluids and, more particularly, to systems and methods for making optimized borehole acoustic measurements.

It is well known in the subterranean well drilling and completion art to perform tests on formations penetrated by a wellbore. Such tests are typically performed in order to determine geological or other physical properties of the formation and fluids contained therein. Measurements of parameters of the geological formation are typically performed using many devices including downhole formation tester tools. In certain applications, the tools may be used for logging-while-drilling (LWD) or measurement-while-drilling (MWD) purposes.

Acoustic tools are commonly employed in geophysical surveys to investigate mechanical properties of the borehole and formation. This is accomplished by measuring the velocity, or equivalently slowness, of wave propagation for different acoustic modes and relating these slowness values to material properties. Acoustic tools that are currently in use generally employ uniformly spaced sensors. In other cases, sensors may be located in discrete blocks or sub-arrays, but sensors within these discrete blocks are designed to be uniformly spaced. The uniform spacing between the sensors leads to the generation of aliases—replicas of the real slowness values of the waveform, occurring because the limited spatial information obtained from the sensors does not lead to a unique solution.

Increasing the number of receivers alleviates the problem, but introduces additional cost, fabrication challenges, and computational inefficiencies in processing due to increased amount of data. Additionally, time semblance based methods typically used to determine slowness from sensor data are designed for uniform spacing, limiting the design alternatives for the sensor placement. What is needed is a system and method to provide stable and accurate measurements of slowness values, creating cleaner semblance images and reducing aliasing, without requiring additional cost, fabrication challenges and computational inefficiencies.

FIGURES

Some specific exemplary embodiments of the disclosure may be understood by referring, in part, to the following description and the accompanying drawings.

Figure 1A:
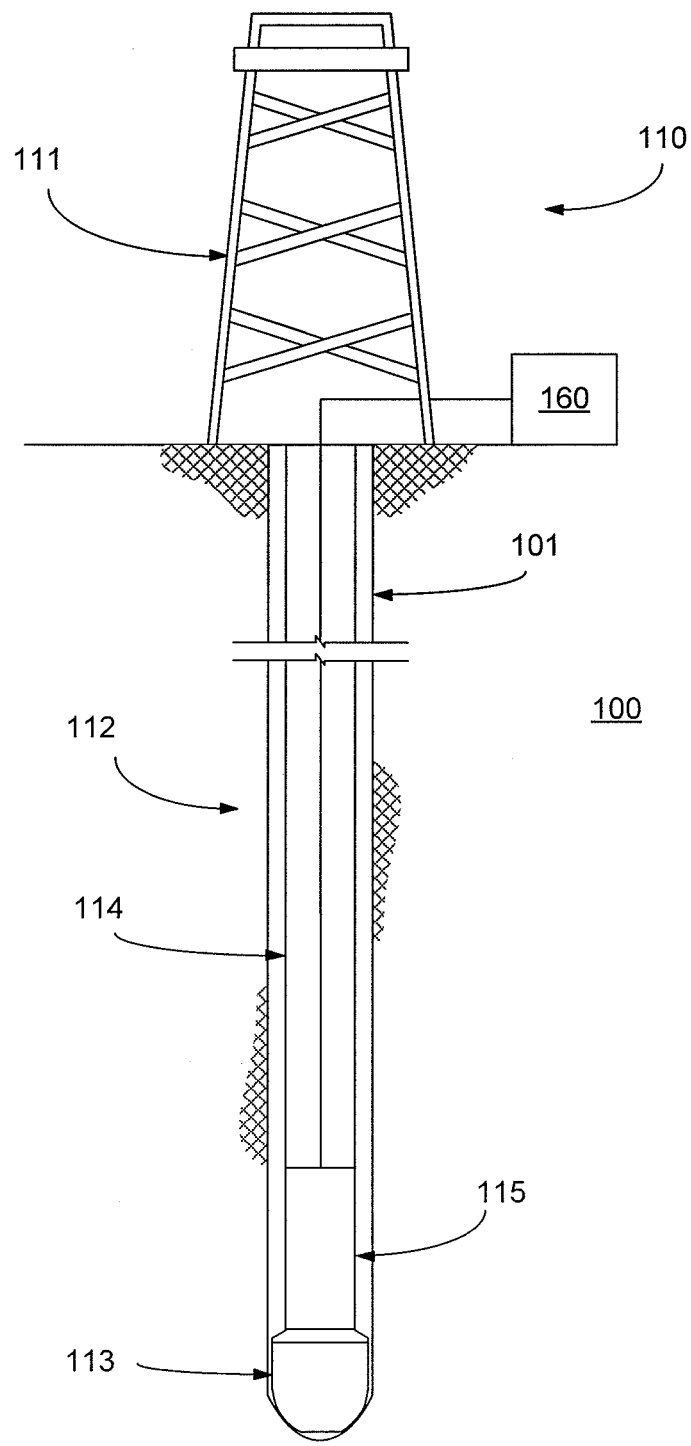
Figure 1B:
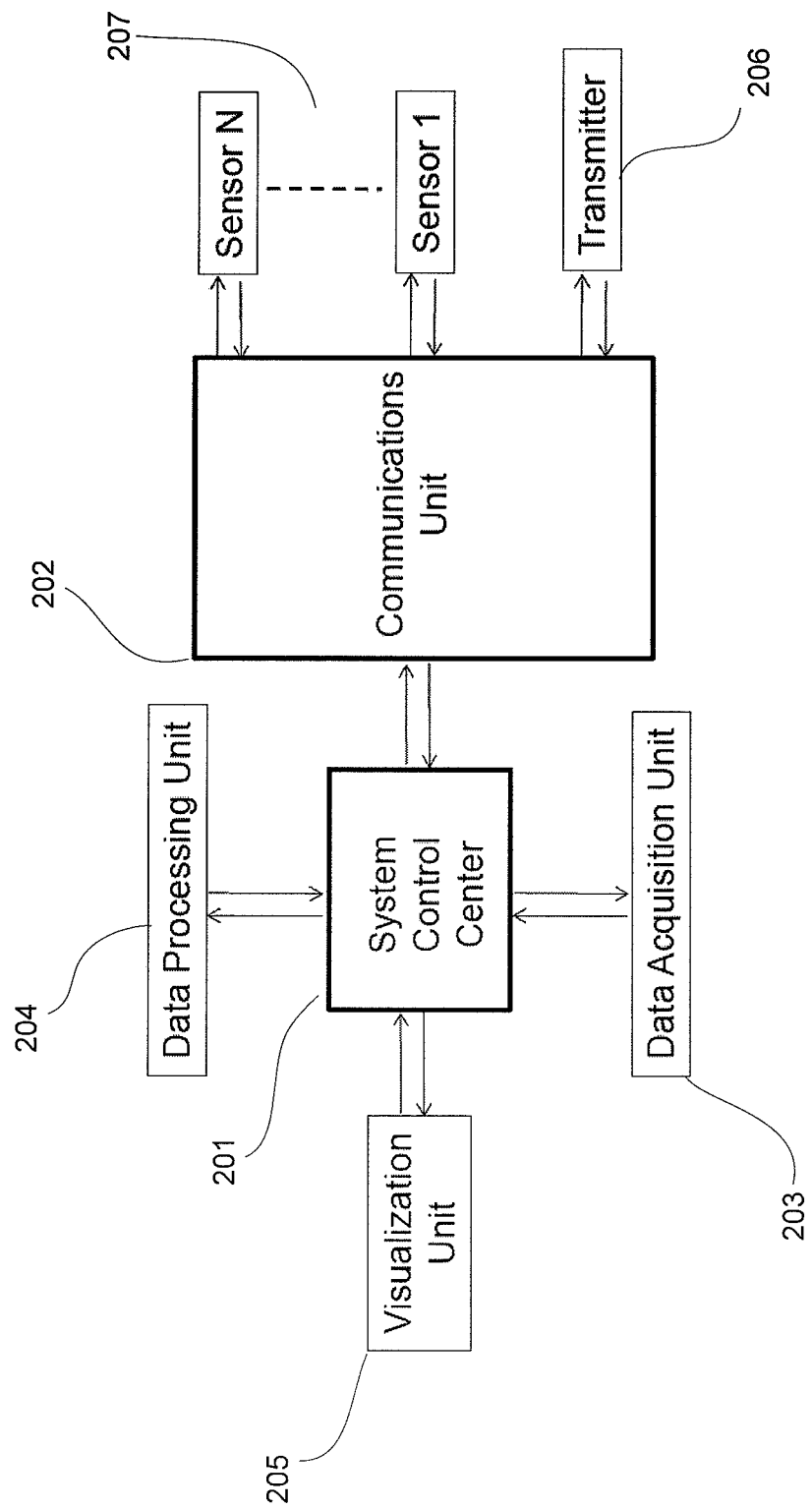
Figure 2B:
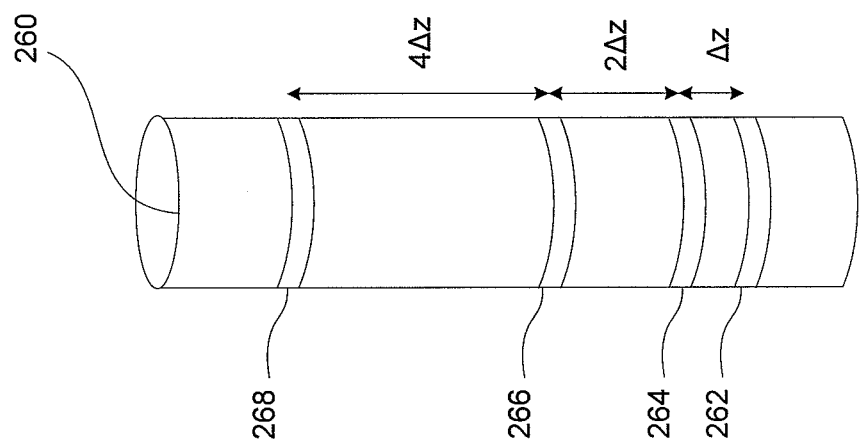
Figure 2A:
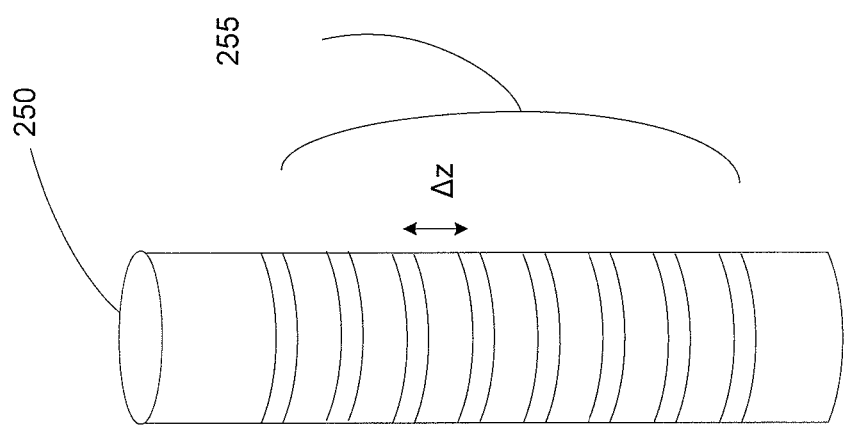
Figure 4:
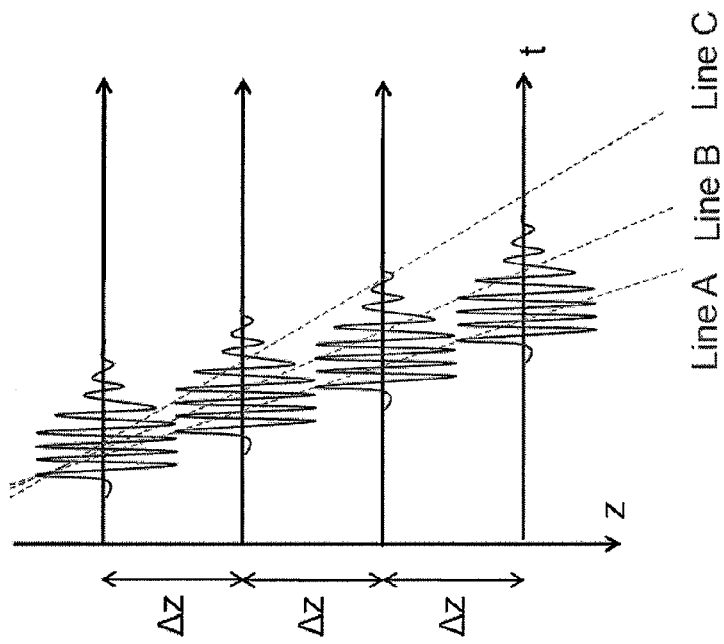
Figure 3:
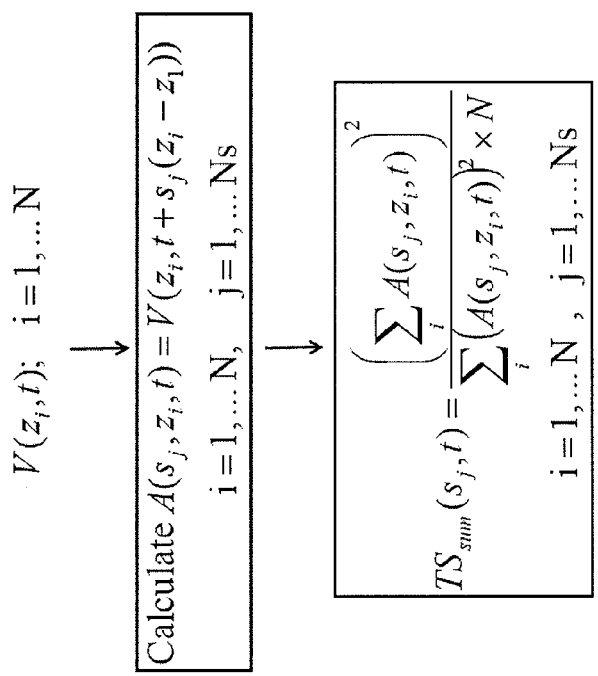
Figure 5:
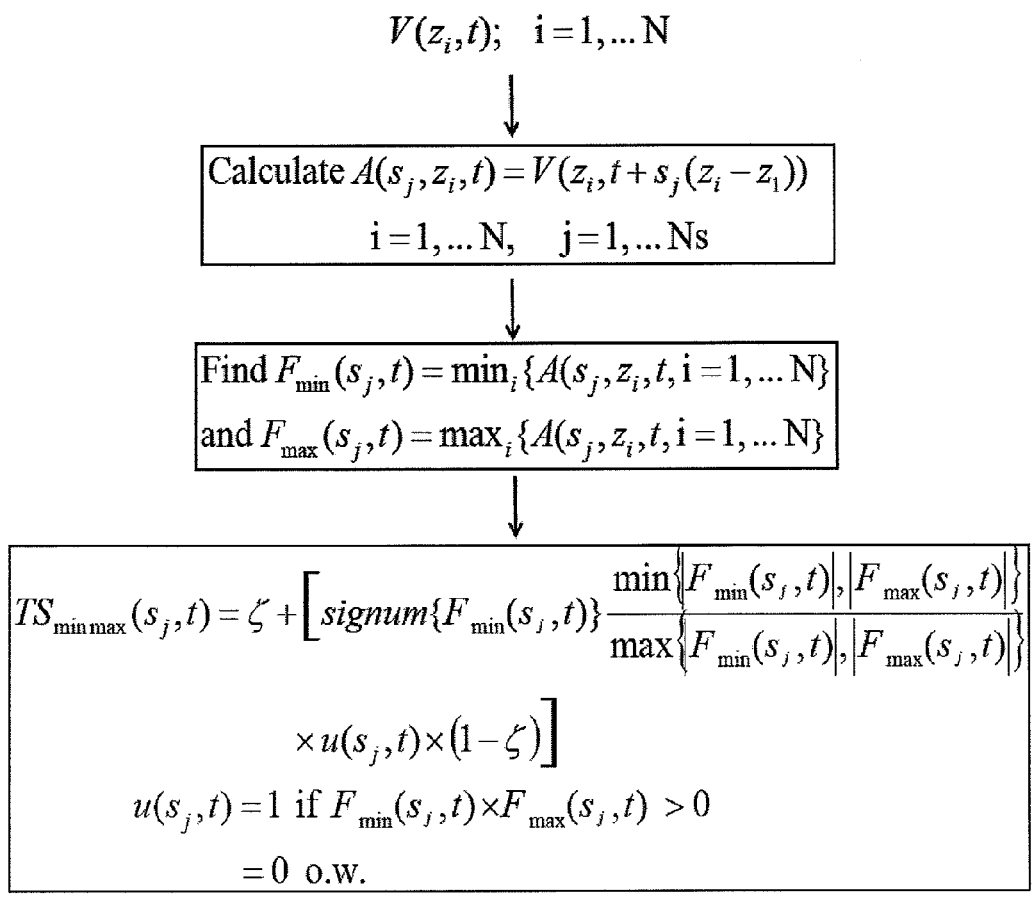
Figure 6:
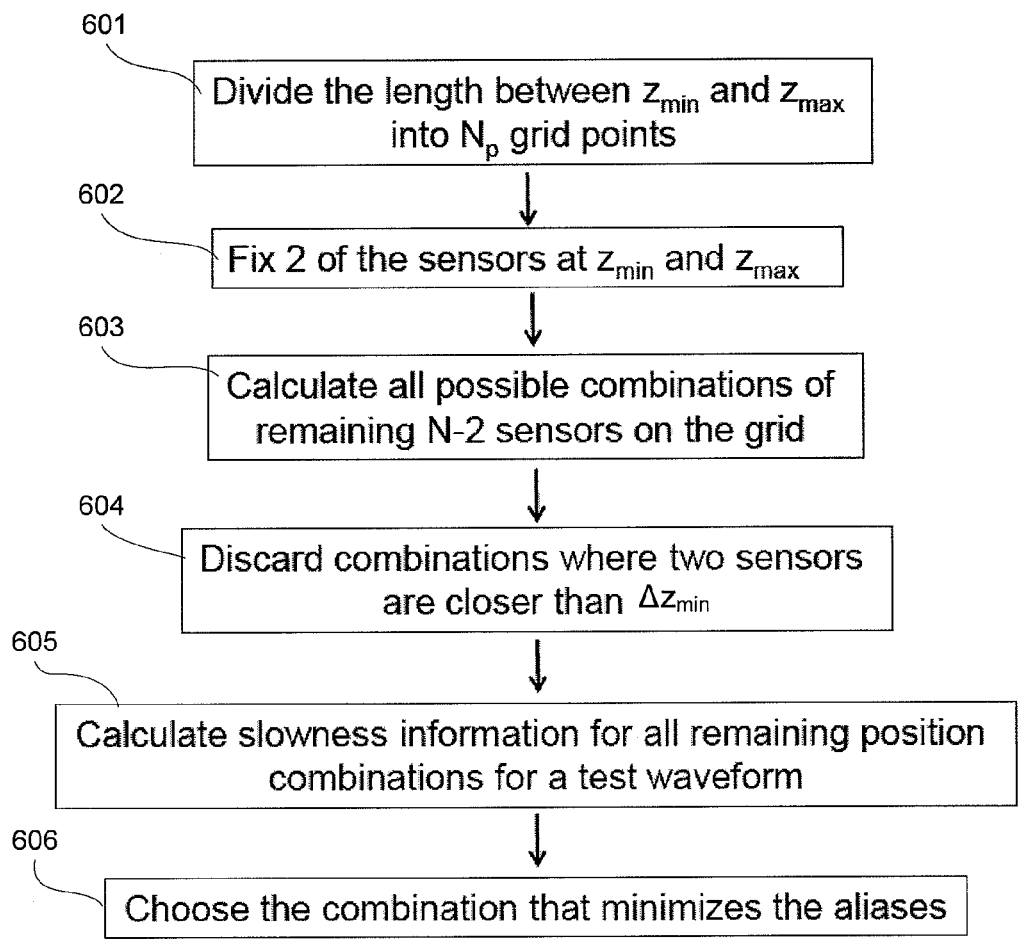
Figure 7:
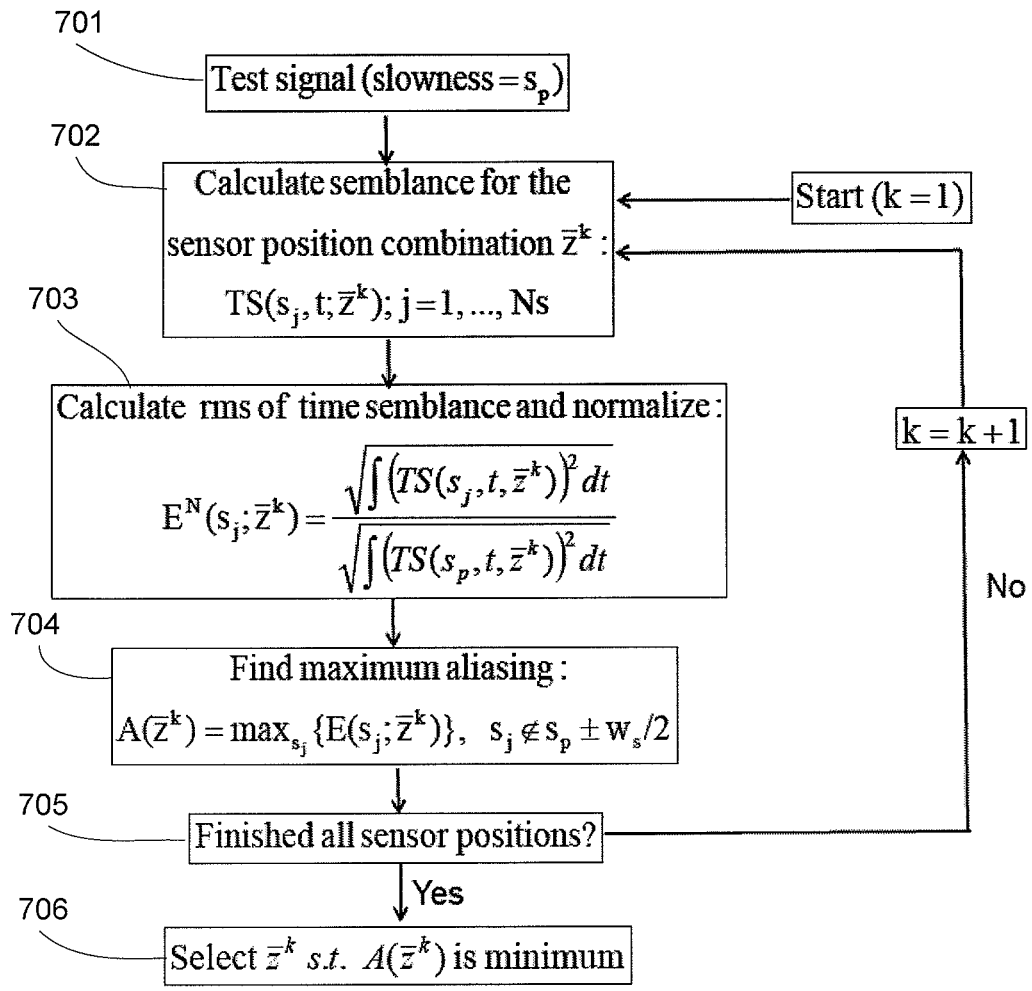
Figure 8:
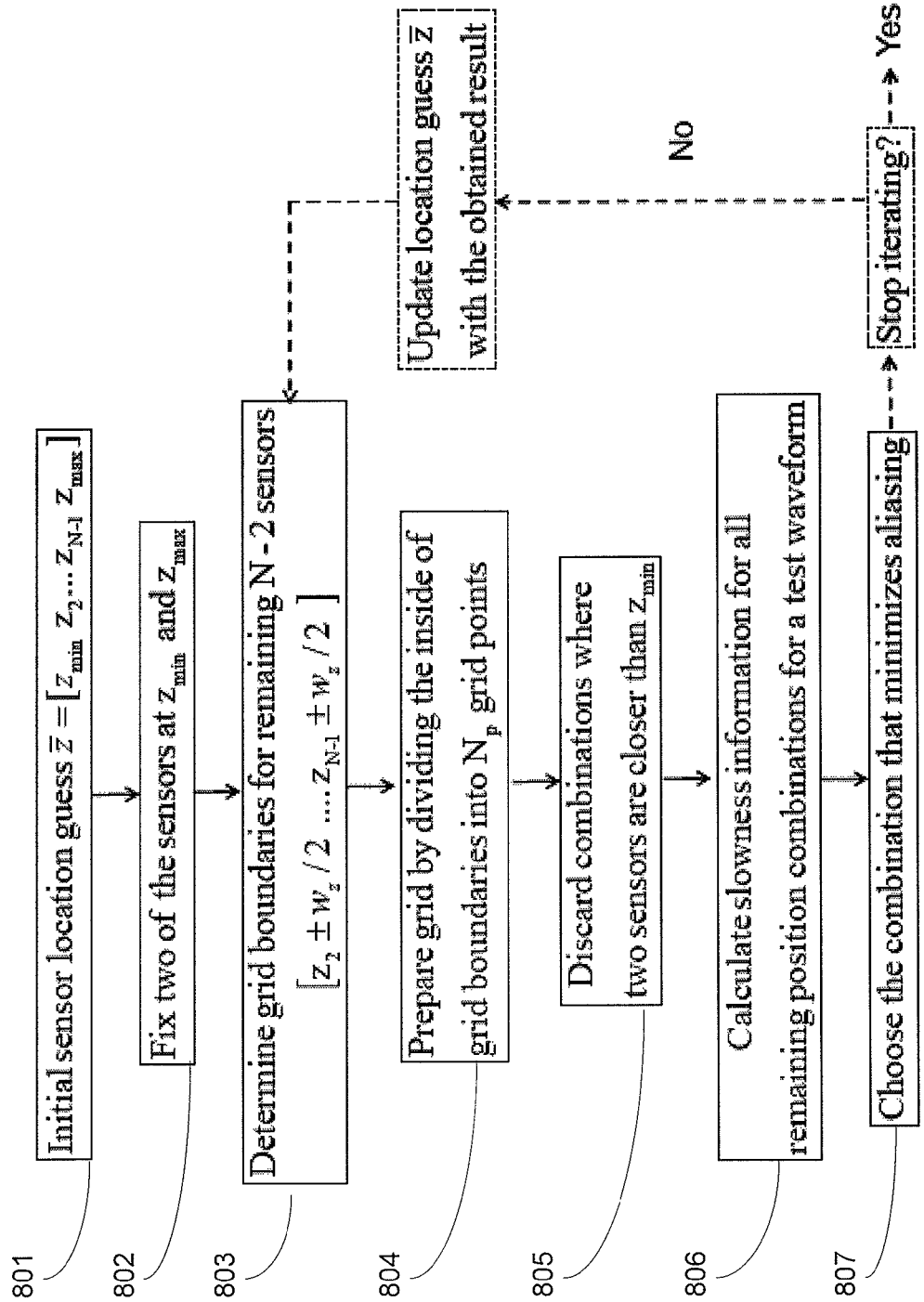
Figure 9A:
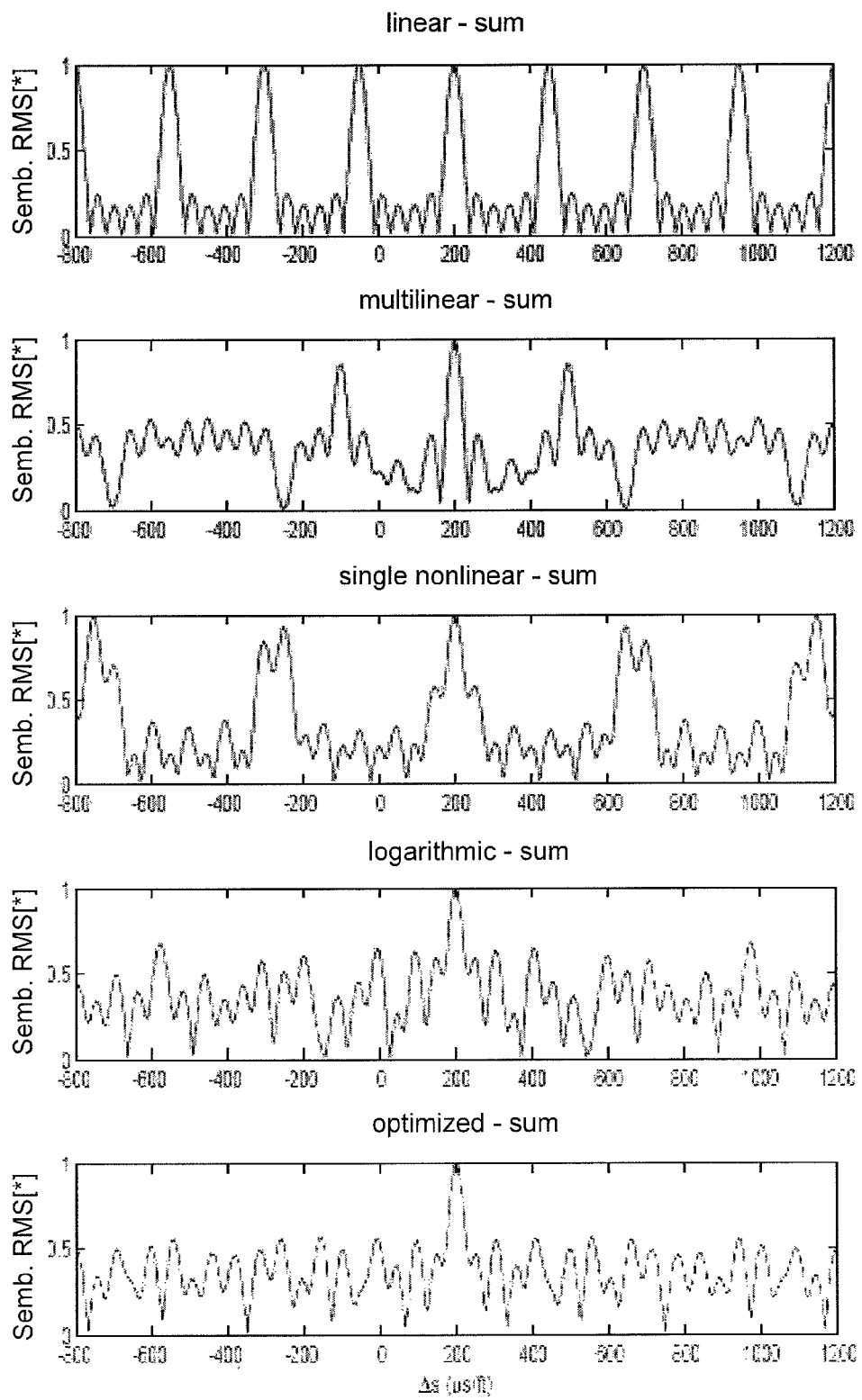
Figure 9B:
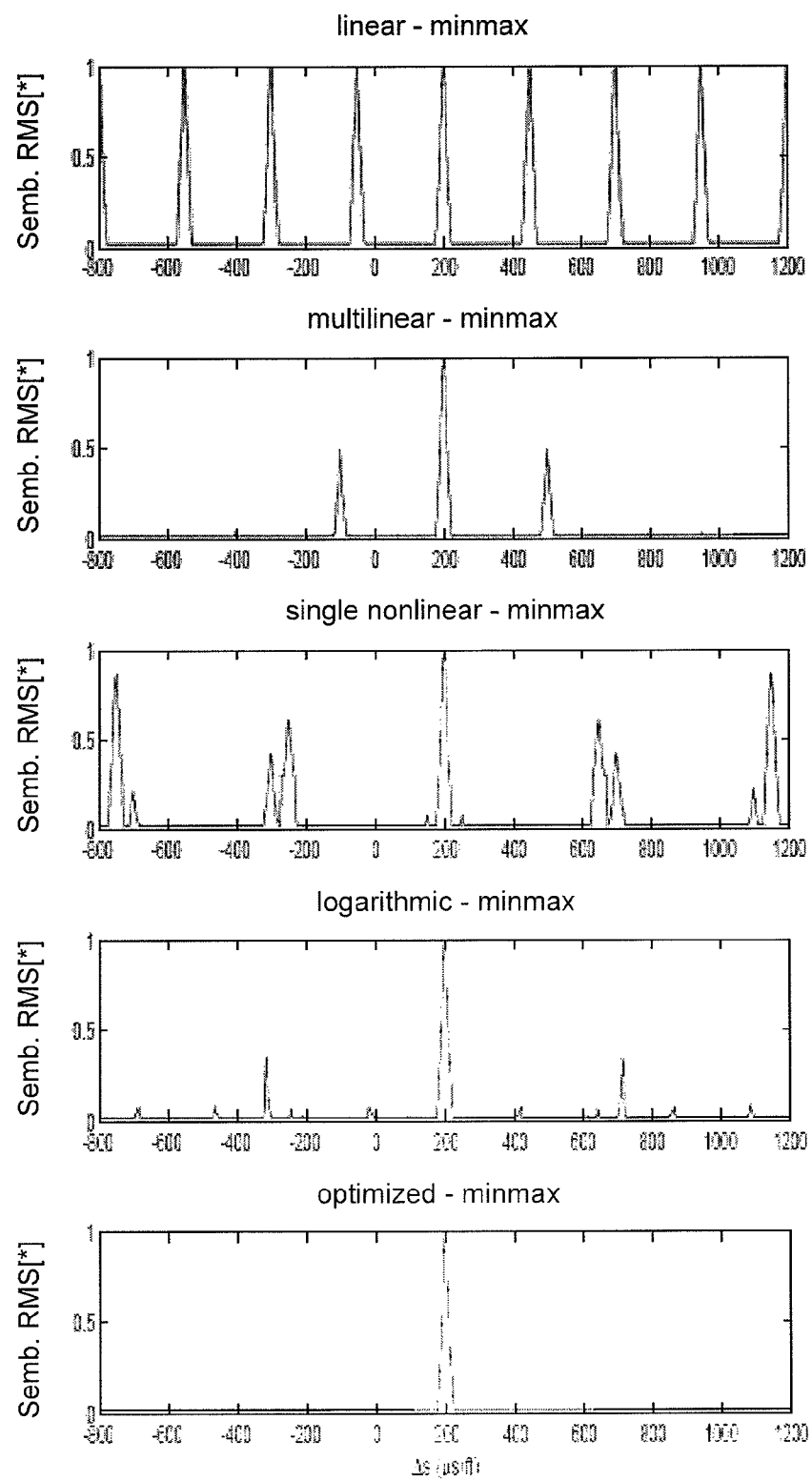
Figure 10A:
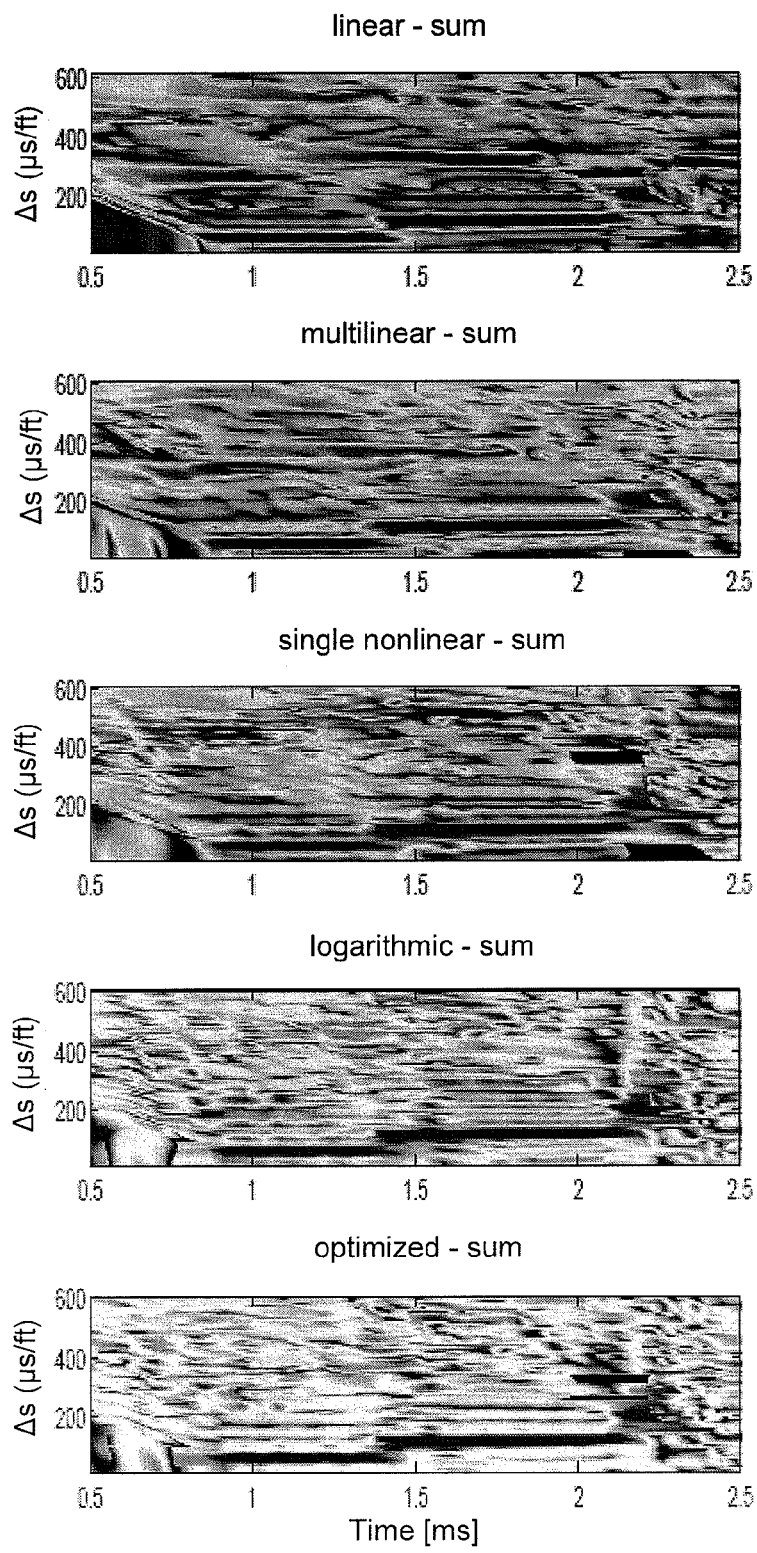
Figure 10B:
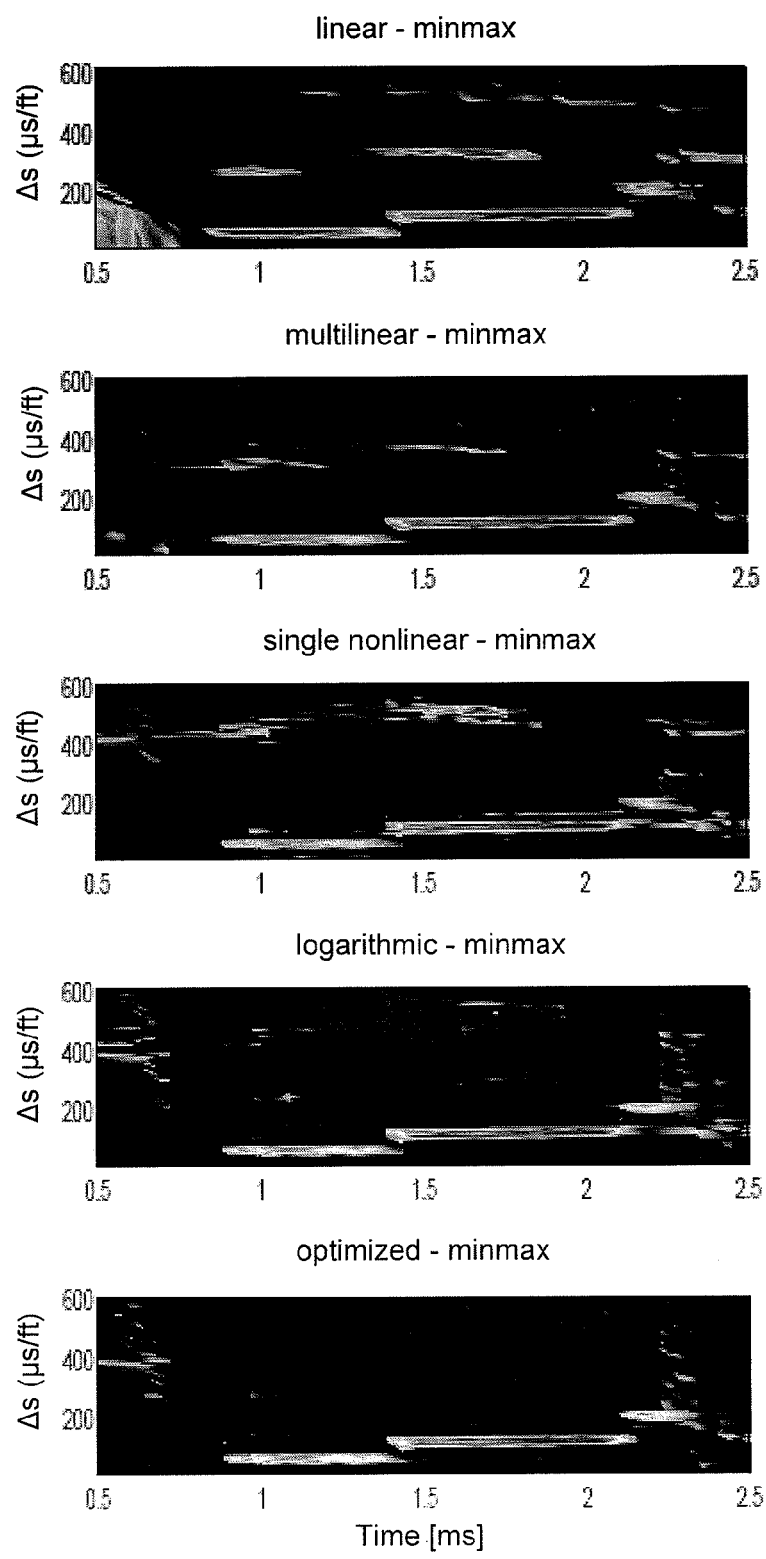

FIG. 1a illustrates an example well with a drilling system.
FIG. 1b illustrates an example acoustic measurement tool
FIG. 2a illustrates an existing acoustic tool with uniform sensor placement.
FIG. 2b illustrates an example acoustic measurement tool with logarithmic sensor placements.
FIG. 3 illustrates an example sum time semblance algorithm.
FIG. 4 illustrates aliasing in an acoustic tool with uniform sensor placement.
FIG. 5 illustrates an example min-max time semblance algorithm.
FIG. 6 illustrates an example sensor optimization method.
FIG. 7 illustrates an example sensor optimization method.
FIG. 8 illustrates an example sensor optimization method.
FIG. 9a illustrates RMS values for example sensor placements.
FIG. 9b illustrates RMS values for example sensor placements.
FIG. 10a illustrates time semblance results for example sensor placements.
FIG. 10b illustrates time semblance results for example sensor placements.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure generally relates to testing and evaluation of subterranean formations and formation fluids and, more particularly, to systems and methods for making optimized borehole acoustic measurements.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Devices and methods in accordance with certain embodiments may be used in one or more of wireline, measurement-while-drilling (MWD) and logging-while-drilling (LWD) operations. Embodiments may be implemented in various formation tester tools suitable for testing, retrieval and sampling along sections of the formation that, for example, may be conveyed through flow passage in tubular string or using a wireline, slickline, coiled tubing, downhole robot or the like.

In this disclosure, a system and a method is proposed to reduce aliasing in borehole acoustic measurements while using a lower number of sensors compared to the traditional acoustic tools. As will be discussed, the system may include a tool utilizing non-uniform spacing between the sensors and using a semblance method optimized for such case. According to certain embodiments, the method for making optimized borehole acoustic measurements may include a novel time semblance algorithm which enhances the effects of nonuniform spacing for aliasing reduction. When compared to a traditional tool with uniform sensor spacing, the system and method described in the disclosure may increase the amount of information in a given frequency range without an increase in number of sensors; produce cleaner time and frequency semblance results with reduced aliasing; increase stability and accuracy of borehole acoustic measurements; increase the allowed measurement frequency and slowness range; and reduce the manufacturing and maintenance costs of the tool by requiring lower number of receivers for desired accuracy.

FIG. 1a illustrates a formation 100 that contains a deposit of a desirable fluid such as oil or natural gas. To extract this fluid, a wellbore 101 is ordinarily drilled in the formation 100 using a drilling system 110. In the example drilling system 110 shown in FIG. 1, a drilling rig 111 couples to a drill string 112, which in turn couples to a drill bit 113. As used herein, a drill string is defined as including drill pipe 114, one or more drill collars 115, and a drill bit 113. The term "couple" or "couples" used herein is intended to mean either an indirect or direct connection. Thus, if a first device "couples" to a second device, that connection may be through a direct connection or through an indirect connection via other devices or connectors. Drill string 112 may include a rotary-steerable system (not shown) that drives the action of drill bit 113 from the surface. The action of drill bit 113 gradually wears away the formation, creating and extending well 101. As the depth of well 101 increases, drill operators add additional drill pipe and/or drill collar segments to drill string 112, allowing drill bit 113 to progress farther into formation 100.

According to aspects of the present disclosure, testing tools may be incorporated into the drill string for LWD and MWD operations. For example, acoustic measurement tools may be included as part of the drill string of the drill collar. Measurements may be received at a control unit 160 on the surface. Power may provided to the measurement tools via a downhole power source, such as a battery, or from a surface power source. Acoustic measurement tools may also be included in wireline logging equipment.

FIG. 1b shows an example implementation of a formation measurement system, incorporating electronic equipments and data acquisition techniques in existing acoustic devices. Operational procedures may be managed by a system control center 201. System control center 201 may be located at the ground or inside the wellbore, disposed in downhole equipment. The systems control center 201 may communicate bi-directionally with the transmitter 206 and sensors 207 of an acoustic tool, such as the acoustic tool shown in FIG. 2b, via a communications unit 202. Although a single transmitter is shown in FIG. 1b, multiple transmitters may be used in some embodiments. The transmitter 206 may transmit energy, such as acoustic waves, into the formation. Sensors 1 through N 207 may be of monopole type, dipole type, or a higher order type, as will be appreciated by one of ordinary skill in the art with the benefit of this disclosure. Sensors 1 through N 207 may measure energy received from the formation, such as acoustic waves reflects from the formation. The type of a sensor may be changed electrically by adjusting the phases of its poles. For example, if a sensor has two poles that are in phase, the resulting sensor is a monopole type sensor. On the other hand, if two poles are 180° out of phase, the sensor would be a dipole type sensor.

A data acquisition unit 203 may communicate bi-directionally with the system control center 201 and may store measurements from the sensors. The measurement may be processed with a data processing unit 204 to determine a formation characteristic, such as slowness information. The data processing unit 204 may also communicate bidirectionally with the system control center 201. A visualizing unit 205 may comprise a computer monitor, for example, and may allow users to monitor the data and interrupt system operation if necessary.

Existing acoustic tools use uniform spacing between sensors. For example, FIG. 2a shows an acoustic tool 250 with sensors 255 spaced uniformly at a distance $\Delta z$. One problem with uniform spacing, however, is that it is they are susceptible to aliasing, making it difficult to distinguish the particular waveform of the signal values measured at the sensor. Aliases may occur because, assuming an acoustic waveform with a slowness at a particular frequency is detected, there is an infinite number of waveforms that may produce the signal values that were measured at the sensors. Significant aliasing makes unambiguous reconstruction of the original waveform from the measured data impossible. Increasing the number of sensors can push the aliased slowness values to an unphysical range and the real slowness may be uniquely determined. However, such method increases both the manufacturing costs and the computational costs associated with the processing of the data.

FIG. 2b illustrates an acoustic tool 260 with non-uniform sensor spacing, according to aspects of the present disclosure. In particular, acoustic tool 260 includes sensors 262, 264, 266, and 268 spaced along the length of the tool at logarithmic multiples of $\Delta z$. In particular, sensors 262 and 264 are spaced at $\Delta z$, sensors 264 and 266 are spaced apart at $2\Delta z$, and sensors 266 and 268 are spaced apart at $4\Delta z$. As will be discussed below, the acoustic tool with non-uniform spacing may achieve similar or better results regarding aliasing than an existing tool with a greater number of sensor. Nonuniform spacing configurations are not limited to embodiments disclosed herein, but may include, for example, optimized spacing and one nonuniformly placed sensor, as well as spacings chosen using non-linear mathematical expressions such as trigonometric and logarithmic functions.

Sensor spacing may be optimized to minimize aliasing, leading to non-uniform sensor spacing. Optimization may include the use of time and frequency semblance algorithms, which are commonly used for the analysis of acoustic data received at the sensors of an acoustic tool. Although the time and frequency semblance algorithms are typically used to adjust for aliasing and arrive at a value close to the real slowness value of the acoustic waveform in the downhole formation, they can also be used as part of an optimization technique to identify sensor placements where aliasing is least, as will be discussed below.

One time semblance algorithm is illustrated in FIG. 3. This method will be referred to as the "sum" algorithm. In FIG. 3, z may denote the position of sensor i along the acoustic tool. Notably, as will appreciated by one of ordinary skill in the art in view of this disclosure, the "sum" algorithm is generalized for non-uniform spacing, as the value of z is not limited to a placement at a uniform multiple of a predetermined value, but can be used to represent the placement of a sensor at a non-uniform location. Additionally, $s_j$ may represent a slowness value of a waveform in the formation. $A(s_j, z_i, t)$ may represent the progression of the waveform for a particular slowness $s_j$. The sum method may determine a total of Ns slowness values over a range of possible slowness values. The results are then added for all sensors to obtain a correlation between the sensors. The result of the calculation is shown as $TS_{sum}$ and is a function of slowness and time.

FIG. 4 further illustrates the principles of time semblance. In particular, FIG. 4 shows the variation of an acoustic waveform over 4 sensors that have a uniform spacing of $\Delta z$. Three different lines illustrate three different slowness solutions used in the semblance analysis. Line A represents a solution matching the real slowness of the waveform. Therefore, when semblance is calculated, peaks and dips of the waveforms will match with each other across the sensors, giving a strong amplitude at times when the waveform has a maximum.

On the other hand, for line C, the calculated slowness does not match the real slowness or any of the aliases. Thus, a maximum at one sensor position will be added together with a lower signal level at another sensor, giving low time semblance amplitude. Finally, Line B depicts a situation where aliasing is present. Peaks of the waveforms at different sensors match for this slowness value as well, causing ambiguity in the results.

The waveforms in FIG. 4 are shown as a continuous function of time. However, in practical systems, waveforms are generally sampled in time. In those cases, where progression of the waveform for slowness $s_j$ ($A(s_j,z_i,t)$ in FIG. 3) does not correspond to an actual time sample, an interpolation scheme may be used.

An alternative time semblance algorithm for use in optimization of sensor placement, called the min-max algorithm, is shown in FIG. 5. As in the sum algorithm, as will appreciated by one of ordinary skill in the art in view of this disclosure, the min-max algorithm is generalized for non-uniform spacing, as the value of z is not limited to a placement at a uniform multiple of a predetermined value, but can be used to represent the placement of a sensor at a non-uniform location. The algorithm may include a determination of a ratio between the minimum and maximum values received by sensor in an acoustic tool for a particular slowness $s_j$. The closer a slowness value $s_j$ is to the real slowness value, the smaller the variation between the minimum and maximum values at the sensors, and the closer the ratio will be to one. If the maximum and minimum have alternating signs, the ratio may be set to 0. The ratio may also be multiplied by the sign of the minimum and further multiplied by a constant, shown as $(1-\zeta)$, and $\zeta$ may be added to the final result. The constant $\zeta$ may represent a threshold that is added to help envelope detection in the results.

Each of the time semblance algorithms described above, as well as other time and frequency semblance methods, may be used as part of an optimization method to optimize the placement of sensors on an acoustic tool according to design parameters of the acoustic tool. One example optimization method is shown in FIG. 6. The design parameters for the optimization method of FIG. 6 may include the minimum sensor spacing possible between two sensors ($\Delta z_{min}$) and number of sensors N. The design parameters may also include the length which the sensors must span, indicated at the end points by $z_{min}$ and $z_{max}$, where two outermost sensors are located are known.

According to the design parameters for a particular acoustic tool, the optimal positions of the remaining N-2 sensors may be found using a brute-force search algorithm. At step 601, the span of an acoustic tool may be divided into an $N_p$ number of grid points. As mentioned above, the grid points are not required to be uniformly spaced. At step 602, a sensor may be placed at the location $z_{min}$ and the location $z_{max}$. At step 603, all possible sensor position combinations on the grid may be calculated. At step 604, any possible sensor location combinations where two sensors are closer than $\Delta z_{min}$ may be discarded. At step 605, using a test signal, the slowness information for all remaining sensor position combinations may be determined. Step 605 may be completed, for example, using a time semblance algorithm such as the sum time semblance algorithm of the min-max time semblance algorithm described above. At step 606, the sensor location combination that minimizes aliasing may be selected.

FIG. 7 illustrates an example method for determining the slowness information for all sensor position combinations, such as in steps 605 and 606 from FIG. 6. In FIG. 7, the time semblance energy of a test signal is found for all possible sensor location combinations. Steps 601-604 in FIG. 6 may be used to determine all possible sensor location combination. These location combinations are shown in FIG. 7, where k is an index for the iteration over the location combinations. At step 701, a test signal may be generated with an assumed center slowness of $s_p$. At step 702, the time semblance for a first sensor position combination may be determined. Step 702 may be completed, for example, using a time semblance algorithm such as the sum time semblance algorithm of the min-max time semblance algorithm, described above. At step 703, the root mean square ("rms") of the time semblance may be calculated and normalized. At step 704, the maximum aliasing for slowness values outside a window around $s_p$ may be determined. The window size ($w_s$) should be large enough to cover the main lobe around $s_p$, but should not cover any of the aliasing lobes. At step 705, it may be determined if all sensor position combinations have been computed. If they have not, the next sensor position combination may be tested, starting at step 702. If they have, the method proceeds to step 706, where the sensor position combination with the lowest maximum aliasing may be selected.

In other example optimization methods, such as the example optimization method shown in FIG. 8, an initial guess for the sensor positions may be entered as an input at step 801. At step 802, sensors may be located along the span of the tool at location $z_{min}$ and $z_{max}$. At step 803, each or the remaining N-2 sensors may be given range, determined by a window, upon which the sensor may be located. This window may be denoted as $w_z$ in FIG. 8. In other examples, the size of the window may vary for each sensor. At step 804, the locations of grid points for the possible sensor locations may be determined at least in part by the sensor location range. A total of Np grid points may be obtained by identifying possible locations for each sensor within the associated sensor window. At step 805 combinations of sensors closer than $\Delta z_{min}$ may be discarded. At step 806, using a test waveform, slowness information for each sensor location combination may be determined. Slowness information may be determined using, for example, either the sum method or the min-max method, described above. At step 807, the sensor position that minimizes the aliasing may be chosen. The slowness information from steps 806 and 807 may be determined, for example, according to the method illustrated in FIG. 7.

The method may be iterated, using the solution obtained as the initial guess for the next iteration. On the second iteration, a smaller window may be used for the preparation of the grid and the above steps may be repeated to obtain the best possible solution. The iterations may continue until a convergence criteria is reached or after a predetermined number of iterations. The optimization method shown in FIG. 8, as well as the optimization method shown in FIGS. 6 and 7 should not be seen as limiting. Instead, numerous other optimization methods may be used as will be appreciated by one of ordinary skill in the art in view of this disclosure.

To quantify the results and demonstrate the implementation of optimization and the unique time semblance techniques, a practical example was simulated. Five possible sensor location combinations are compared in the results:

i) linear spacing (denoted as "linear" in FIGS. 9a and 9b), ii) two distinct blocks of uniform spacing (sensors at a distance of 10, 10.372, 10.744, 11.574, 12.037 and 12.50 ft. from transmitter, denoted as "multilinear" in FIGS. 9a and 9b), iii) single non-uniform spacing on an otherwise uniform array (sensors at a distance of 10, 10.26575, 10.5315, 10.79725, 11.063 and 12.5 ft. from transmitter, denoted as "single nonlinear" in FIGS. 9a and 9b), iv) logarithmic spacing (sensors at a distance of 10, 10.0806, 10.2419, 10.5645, 11.2097 and 12.5 ft. from the transmitter, denoted as "logarithmic" in FIGS. 9a and 9b), and v) optimized spacing, according to an optimization method similar to that illustrated in FIG. 8 (denoted as "optimized" in FIGS. 9a and 9b).

Logarithmic spacing was taken as the initial guess for the optimization algorithm, with the number of grid points (Np) being 140 and $\Delta z_{min}$ being 0.03875 ft. The results of the optimization depend on the data processing algorithm used. For comparison purposes, optimized spacing was calculated using both the sum method, such as the one in FIG. 3, and the min-max method, such as the one shown in FIG. 5. The test signal used in the optimization and the test procedure was a sinusoid with a center slowness of 200 µs/ft and frequency of 8 kHz. As a result of the simulations, optimized positions were found as (10, 10.11966, 10.23759, 10.59118, 11.54829 and 12.5) ft for the min-max time semblance and (10, 10.10874, 10.3333, 10.79362, 11.36295 and 12.5) ft for sum time-semblance.

In addition to being used to optimize sensor locations, as shown in FIG. 7, RMS results can be used to demonstrate the relative effectiveness of sensor placement for comparison purposes. Rms results for the sum and min-mix time semblance algorithms for each of the different sensor location combinations are plotted in FIGS. 9a and 9b. The results generated using the sum method for each of the five sensor placements listed above are shown in FIG. 9a and the results generated using the min-max method for each of the five sensor placements listed above are shown in FIG. 9b.

As can be seen, the peak of each of the aliases has the same amplitude with the real slowness value (200 µs/ft) for the linear spacing in both the sum and min-max methods. As can further be seen, the sum method does not markedly decrease aliasing noise in the rms for the multilinear case. However, when min-max algorithm is used, the rms amplitude of the alias peaks are significantly reduced. These aliases are further reduced when logarithmic spacing is used, particularly for the min-max method. Of the combinations shown, the best aliasing performance is obtained for the optimized sensor locations using the min-max algorithm, as an almost a constant rms level around the main lobe is obtained.

FIGS. 10a and 10b illustrate time semblance results for the sensor placements used in FIGS. 9a and 9b. As can be seen, the final time semblance results are plotted in an example unit of slowness Δs (µs/ft) versus time. The time semblance results calculated using the sum method for each of the five sensor placements listed above are shown in FIG. 10a and the time semblance results calculated using the min-max method for each of the five sensor placements listed above are shown in FIG. 10b.

As can be seen in both FIGS. 10a and 10b, aliasing is comparatively worse for linear spacing than in any other spacing configuration, as can be seen by the false slowness value near 400 Δs. The false slowness value near 400 Δs is slightly improved with multilinear spacing, with an even greater improvement using the single nonlinear spacing, but a false slowness value is still present in both. Logarithmic spacing produces even sharper images with greatly reduced aliasing, as the false slowness value is nearly eliminated. As can be seen, the greatest reduction in aliasing is seen when optimized spacing is used. Moreover, these improvements are significantly more pronounced when min-max time semblance algorithm is applied.

Therefore, the subject matter of the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A system for measuring a time semblance of a formation, comprising:
    a transmitter, wherein the transmitter transmits energy into the formation;
    a plurality of sensors comprising a plurality of consecutive sensors, wherein the plurality of sensors measures energy received from the formation, wherein at least one of the plurality of consecutive sensors is positioned in a non-uniform axial spacing configuration, and wherein the non-uniform axial spacing configuration of the at least one of the plurality of consecutive sensors is determined, at least in part, using a time semblance algorithm, wherein the time semblance algorithm comprises determining $$TS_{sum}(s_j, t) = \frac{\left(\sum_i A(s_j, z_i, t)\right)^2}{\sum_i (A(s_j, z_i, t))^2 \times N},$$

wherein t is a time, wherein N is a total number of the plurality of sensors, Ns is a total number of slowness values, i is a value from 1 to N, j is a value from 1 to Ns, $z_i$ denotes a position of sensor i along a tool, $s_j$ represents a slowness value of a waveform in the formation, and $A(s_j, z_i, t)$ represents a progression of the waveform for a particular slowness $s_j$; and a data processing unit including at least one time semblance algorithm, wherein the data processing unit receives measurements from the plurality of sensors and processes the measurements to determine a time semblance of the formation.

2. The system of claim 1, wherein the non-uniform spacing configuration comprises one of a spacing with one non-uniformly spaced sensor and a spacing determined using at least one non-linear mathematical expression.

3. The system of claim 1, wherein the non-uniform spacing configuration comprises spacing optimized to reduce aliasing.

4. The system of claim 3, wherein the time semblance algorithm is a min-max time semblance algorithm.

5. The system of claim 3, wherein the time semblance algorithm is a sum time semblance algorithm.

6. The system of claim 3, wherein the spacing optimized to reduce aliasing is determined using at least one iterative step.

7. The system of claim 1, wherein the at least one time semblance algorithm includes a time semblance algorithm for non-uniform sensor spacing.

8. The system of claim 1, wherein the at least one time semblance algorithm comprises one of either a sum time semblance algorithm or a min-max time semblance algorithm.

9. A method for measuring a time semblance of a formation, comprising:

introducing an acoustic measurement tool into a wellbore, wherein the acoustic measurement tool includes a transmitter and a plurality of sensors comprising a plurality of consecutive sensors, wherein at least one of the plurality of consecutive sensors is positioned in a non-uniform axial spacing configuration, and wherein the non-uniform axial spacing configuration of the at least one of the plurality of consecutive sensors is determined, at least in part, using a time semblance algorithm, wherein the time semblance algorithm comprises determining $$TS_{sum}(s_j, t) = \frac{\left(\sum_i A(s_j, z_i, t)\right)^2}{\sum_i (A(s_j, z_i, t))^2 \times N},$$

wherein t is a time, wherein N is a total number of the plurality of sensors, Ns is a total number of slowness values, i is a value from 1 to N, j is a value from 1 to Ns, $z_i$ denotes a position of sensor i along a tool, $s_j$ represents a slowness value of a waveform in the formation, and $A(s_j, z_i, t)$ represents a progression of the waveform for a particular slowness $s_j$;

transmitting energy from the transmitter into the formation;

measuring at the plurality of sensors energy received from the formation; and determining a time semblance of the formation using at least one time semblance algorithm generalized for non-uniform sensor spacing.

10. The method of claim 9, wherein the non-uniform spacing configuration comprises one of a spacing with one non-uniformly spaced sensor and a spacing determined using at least one non-linear mathematical expression.

11. The method of claim 9, wherein the non-uniform spacing configuration comprises spacing optimized to reduce aliasing.

12. The method of claim 11, wherein the time semblance is a min-max time semblance algorithm.

13. The method of claim 11, wherein the spacing optimized to reduce aliasing is determined using at least one iterative step.

14. The method of claim 9, wherein the at least one time semblance algorithm generalized for non-uniform sensor spacing comprises one of either a sum time semblance algorithm or a min-max time semblance algorithm.

* * * * *